US007558940B2

(12) United States Patent
Hancock (10) Patent No.: US 7,558,940 B2
(45) Date of Patent: Jul. 7, 2009

(54) VIRTUAL MEMORY TRANSLATOR FOR REAL-TIME OPERATING SYSTEMS

(75) Inventor: William R. Hancock, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 175 days.

(21) Appl. No.: 11/678,126

(22) Filed: Feb. 23, 2007

(65) Prior Publication Data

US 2007/0136556 A1    Jun. 14, 2007

Related U.S. Application Data

(62) Division of application No. 10/659,922, filed on Sep. 11, 2003, now Pat. No. 7,200,733.

(51) Int. Cl.
*G06F 12/00* (2006.01)
(52) U.S. Cl. .................................................. 711/206
(58) Field of Classification Search ....................... None
See application file for complete search history.

(56) References Cited

U.S. PATENT DOCUMENTS

| 5,586,283 | A |    | 12/1996 | Lopez-Aguado et al. |
|-----------|---|----|---------|---------------------|
| 5,627,987 | A | *  | 5/1997  | Nozue et al. ................. 711/200 |
| 5,696,925 | A |    | 12/1997 | Koh |
| 6,202,118 | B1 | * | 3/2001  | Klein ............................. 711/4 |
| 6,643,759 | B2 |    | 11/2003 | Andersson et al. |

* cited by examiner

*Primary Examiner*—Brian R Peugh
(74) *Attorney, Agent, or Firm*—Fogg & Powers LLC (57) ABSTRACT

A multi-tiered lookup table is used to progressively map a virtual address to a specific control word that facilitates resolution of the virtual address for a translation lookaside buffer (TLB) miss. In one embodiment, the control word has a compressed and efficiently encoded image of the TLB hardware register data. The control word is accessed with or without a level of indirection in various embodiments. In some embodiments, the control word provides all information needed to decode the majority of memory blocks, or points to a third level for special blocks.

6 Claims, 6 Drawing Sheets

TLB CONTROL TABLE ENTRY FOR AT LEAST ONE VALID BIT = 1.
V=1 (VALID ENABLE)
R=1 IF VALID PAGES ARE READ ENABLED.
W=1 IF VALID PAGES ARE WRITE ENABLED.
E=1 IF VALID PAGES ARE USER EXECUTABLE.
VALID BITS ARE IN REVERSE ORDER (MS BIT = PAGE 0, LS BIT = PAGE 15.

TLB CONTROL TABLE ENTRY FOR VALID BITS ALL = 0.
(USED WHEN IO = 1, RPN REQUIRES MORE THAN 8 BITS, OR MIX OF RE,UE,WE).
NOTE: SAVE ONE EXTENDED DECODE CLOCK IF USE BYTE OFFSET INSTEAD OF TABLE NUMBER.

TLB EXTENDED CONTROL TABLE ENTRY
PAGE IS INVALID IF RE,WE,UE ALL = 0.
NOTE: ASSUMES PGM ALWAYS = 0.

FIG. 3

TLB CONTROL TABLE EXTRY
UR = 1 IF PAGE IS READ ENABLED.
UW = 1 IF PAGE IS WRITE ENABLED.
UE = 1 IF PAGE IS USER EXECUTABLE.
IO = 1 IF PAGE IS IN I/O SPACE.
PAGE IS INVALID IF RE,WE,UE ALL = 0.
NOTE: ASSUMES PGM = 0.

VIRTUAL MEMORY TRANSLATOR FOR REAL-TIME OPERATING SYSTEMS

CROSS-REFERENCE TO RELATED APPLICATIONS

This application is a divisional of application Ser. No. 10/659,922, filed on Sep. 11, 2003 now U.S. Pat. No. 7,200,733.

FIELD OF THE INVENTION

The present invention relates to virtual memory translators, and in particular to a virtual memory translator for real-time operating systems.

BACKGROUND OF THE INVENTION

Computer systems describe the physical location of data in memory using physical addresses. The physical address points directly to data stored on a memory chip. Multiple memory chips make up a local memory of a computer system that is limited in size. However, the amount of data the computer system can handle is much larger. A different type of address, called a virtual address is used to uniquely identify the larger amount of data. For the computer system to use this data, it must be stored in the local memory. The computer system uses a virtual address translation mechanism to determine where to locally store data represented by a virtual address.

Real-time operating systems of computer systems have a translation mechanism to map virtual addresses to physical addresses and to ascertain access rights. The number of physical addresses available is usually hardware constrained to a limited number of active memory blocks. Whenever an access is performed to a block that is not present in a hardware register set, then an interrupt occurs. An interrupt routine must determine if the memory block being requested is valid, and reload the hardware register set to replace an existing block such that the new block is enabled. The time to resolve these addresses during the interrupt routine is generally excessive.

One prior method of translating virtual address to real or physical addresses utilized a series of three tables. In this method, a portion of the virtual address points to a first table having multiple entries. The entry pointed to is combined with further bits point to a second table. The second table has an entry which is combined with still further bits to point to an entry in a third table. The entry is a two word entry with the real address. This method takes five reads to decode the address using three tables and two words.

SUMMARY OF THE INVENTION

A multi-tiered lookup table is used to progressively map a virtual address to a specific control word that facilitates resolution of the virtual address for a translation lookaside buffer (TLB) miss. In one embodiment, the control word has a compressed and efficiently encoded image of the TLB hardware register data. The control word is accessed with or without a level of indirection in various embodiments. In some embodiments, the control word provides all information needed to decode the majority of memory blocks, or points to a third level for special blocks.

The control word may contain an array of valid bits that specify if the current block is valid or if it is dual-used for specifying the third level decode. In one embodiment, a first level is fixed in size, and lower levels are typically smaller in size.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

In the description of different embodiments, specific numbers of bits in various fields may be identified. The numbers of bits may be varied significantly in different implementations. In some embodiments, a block size, 4 k bytes, may be smaller or larger, and the total memory address space of 32 bits may also vary, resulting in the need for different numbers of address bits and lengths of fields in various decode tables described herein. The explanation assumes that the bit numbers is 0 for the least significant (right most) bit and bit 31 is the most significant bit position.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
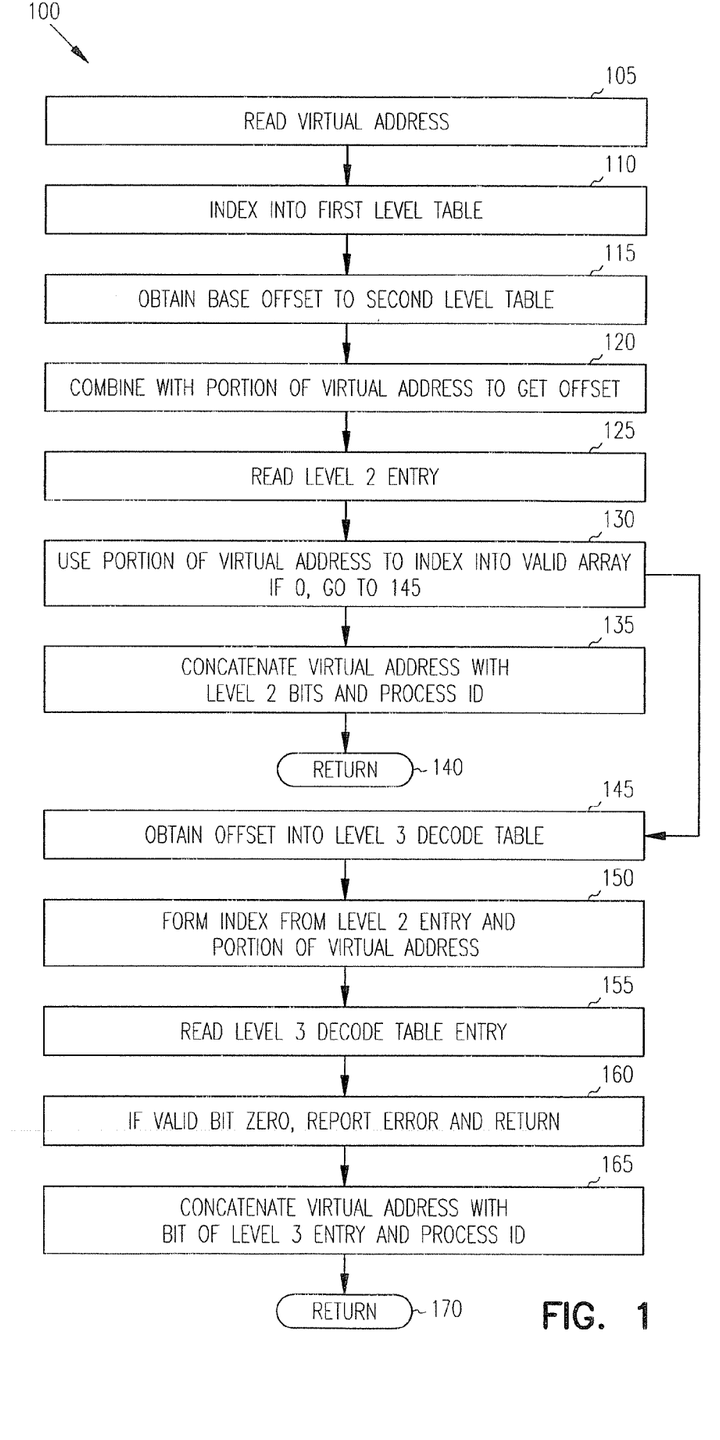
FIG. 1 is a flowchart of an interrupt handler for translating virtual addresses according to an embodiment of the invention.

FIG. 1 is a flowchart of an interrupt handler 100 according to one embodiment of the invention. In a translation lookaside buffer (TLB) miss, an interrupt occurs because a block of data to be accessed is not present in the hardware TLB registers. In response, an interrupt handler is initiated at 105, and the virtual address needing to be resolved is read from the hardware register. In one embodiment, a memory block size is approximately 4 K bytes. Bits 20-31 of the virtual address are used to index into a base dispatch decode table at 110. At 115, a level 1 decode table is read to obtain a base offset into a level 2 decode table. The level 1 decode table entry plus bits 16-20 of the virtual address are used to obtain the offset into the level 2 decode table at 120.

At 125, the level 2 decode table entry of 32 bits is read. It is either an offset to a level 3 decode table, or data for processing the current block. Bits 12-15 are used at 130 to index into a 16 bit valid array of the level 2 entry. If the selected bit is 0, then a further level 3 decoding is performed at 145. Otherwise, this is a valid block for level 2 decoding, and the virtual address is concatenated 135 with the remaining 16 bits of the level 2 decode table entry and a Process ID to fill the TLB miss control hardware registers. The least significant bits of the virtual address and the real address are the same.

At 140, the interrupt routine is returned from, allowing normal hardware resolution that the access type is permitted. If at 130, the selected bit is zero, then a further processing is performed at 145. If all 16 bits in the valid array of the level 2 decode table entry are not 0, then this is an invalid memory block, and normal error reporting is performed at 145. Otherwise, the remaining 16 bits in the level 2 decode table entry is the base offset to the level 3 decode table.

The third level table is used for the case where normal rules were not followed. There might be different access rights within a block, or the top address bits might not be the same. At 150, an index into the level 3 table is formed from the level 2 entry and bits 12-15 of the virtual address, and the level 3 table entry is read at 155. If the valid bit in the level 3 table entry is 0, then this is an invalid memory block, and normal error reporting is performed at 160. Otherwise, it is a valid memory block and the virtual address is concatenated 165 with the 32 bits of the level 3 decode table entry and the Process ID to fill the TLB miss control hardware registers. At 170, the interrupt routine is returned from, allowing normal hardware resolution that the access type is permitted.

In one embodiment, a dedicated hardware register contains the base dispatch decode table address for the current partition (general register—gr65 in the diagrams). A second dedicated hardware register (gr66 in this example) contains the offset from the base dispatch table to the level 2/3 decode tables in one field (bits 31 to 8) and the Process ID value in a second field (bits 8 to 0) for the currently active process in this partition. The number associated with the general registers are purely for example, and any type of register or other storage element may be utilized.

In one embodiment, multiple user programs in partitions co-exist, with each partition having a unique set of tables which are selected by the operating system upon partition activation by loading the base address register or location for the table corresponding to that partition. This allows different partitions to have different memory mappings, which, for example, might preclude one partition from writing to another partition's memory area. A user partition can be composed of a single process or multiple processes, with each process using the common base dispatch table. Each process also has a unique set of level 2 and 3 tables which are selected by the operating system upon process activation by loading the level 2 offset field and process identification field in a dedicated register or location.

Figure 2:
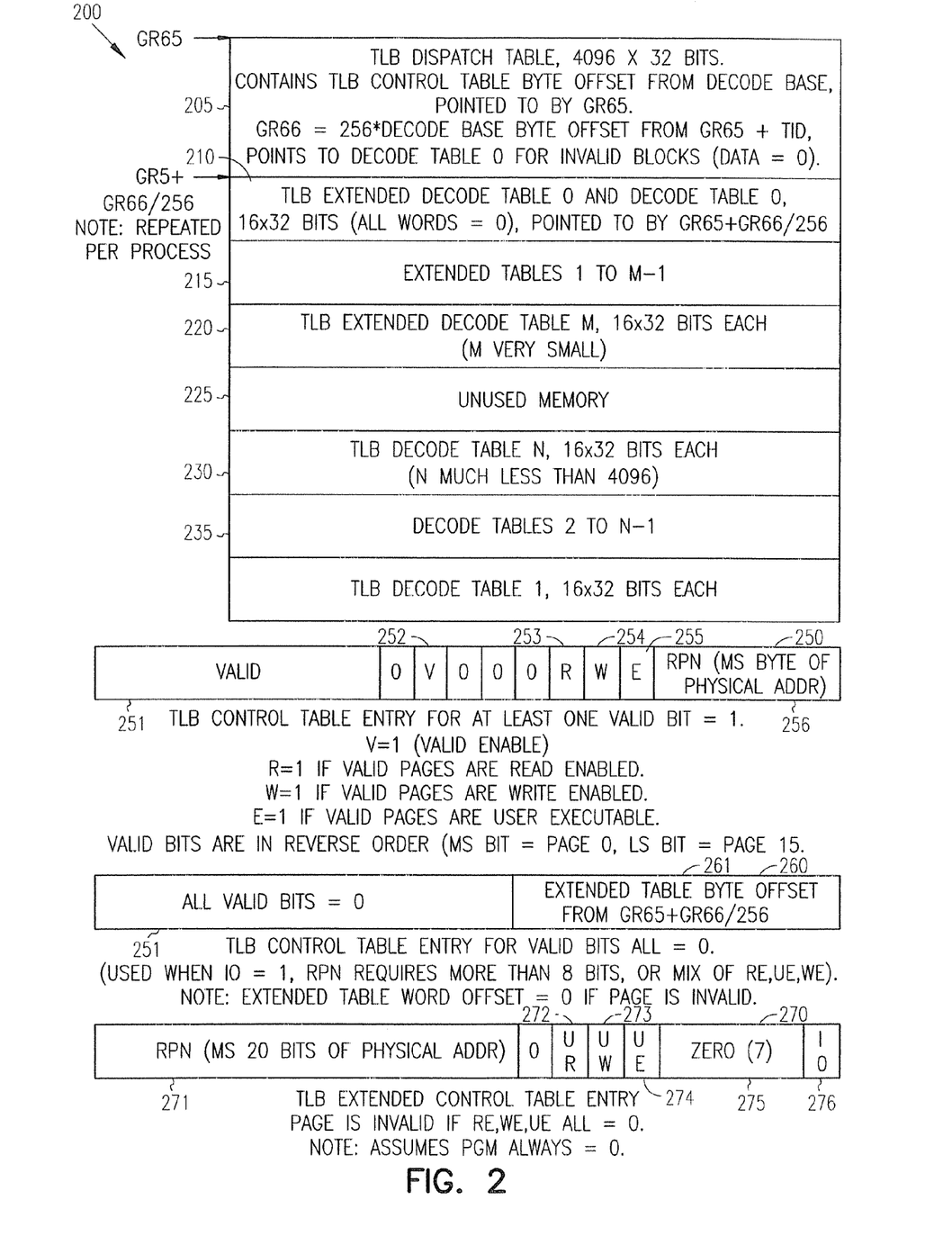
FIG. 2 is a text representation of a decode table structure according to an embodiment of the invention.

FIG. 2 is a diagram of a decode table structure 200 according to one embodiment of the present invention. This embodiment is referred to as a slim embodiment because of the low memory requirements. A TLB dispatch table 205 is 4096×32 bits in one embodiment. TLB dispatch table 205 contains TLB level 2 table byte offsets and is indexed by adding the most significant 12 bits of the virtual address (bits 31 to 20) to the base address in the first dedicated hardware register (gr65). This offset from table 205 is added to level 2/3 offset field of gr66 (bits 31 to 8) which is then added to the base address in gr65 to point to the level 2 decode table. It points to decode table 0 at 210 for invalid data blocks (table 205 offset=0). The TLB extended decode table 0 and decode table 0 at 210 are 16×32 bits (all words=0). Extended tables 1 to m−1 comprises a second level decode table as indicated at 215, followed by extended table m at 220, which are 16×32 bits each. "m" is typically very small in this embodiment.

Unused memory is indicated at 225 is optional, followed by TLB decode tabled n, which is also 16×32 at 230. In one embodiment, "n" is much less than 4096. Decode tables 2 to n−1 are shown at 235, and decode table 1 at 16×32 bits is shown at 24.

The format of a TLB control table entry with at least one valid bit equal to 1 is shown at 250. A valid field 251, referred to as valid bits is shown at 251. Several single bit fields are shown following the valid bits are used provided at least one valid bit is on. A bit V at 252 is a valid enable bit. An R bit 253 is used to indicate if valid pages are read enabled. A value of 1 provides such an indication. Similarly, a W bit 254 indicates if valid pages are write enabled, and an E bit 255 indicate if valid pages are executable. Finally, the Real Page Number (RPN) field indicates a most significant byte of the physical address at 256. The order of the bits and fields may be changed as desired.

The format of a TLB control table entry used when all the valid bits are zero, or off, is shown at 260. This table entry comprises a valid field 251, and an extended table byte offset 261. This table entry is used when the page or block is in I/O address space as indicated when IO=1, RPN requires more than 8 bits, or when the R, E or W bits vary within a single block (64 K bytes in this embodiment). The extended table word offset is zero if the page is invalid.

Finally, a TLB extended control table entry is shown at 270. A RPN comprising the most significant 20 bits of the physical address is indicated at 271. The extended control table entry 270 further comprises bits User Read, User Write and User Execute Enables (UR) 272, (UW) 273 and (UE) 273, and seven zero bits indicated at 275. The page is invalid if RE, WE and UE are all zero. It is also assumed that other fields, such as User Programmable output debug pins (PGM) is always zero. An IO bit is also indicated at 276

The following example illustrates the process. Assume that a virtual address of 0x2e13fc0 (2e13fc0 base 16 or hexadecimal) needs to be translated. Entry 0x2e1 (737 decimal) of the level 1 table is read (from gr65 offset by 0x2e1). Assume that entry contains 0x140. This is then the offset into the second level decode table. Assume gr66 contains 0x00180001. The offset in the most significant 24 bits of gr66 is 0x1800 which is added to 0x140 to get 0x1940. This is added to the base address in gr65 to access the level 2 entry for this virtual address. The next 4 bits of the virtual address (bits 15 to 12) contains 0x3, so bit 28 (31-3) of the level 2 entry is checked for validity. If it contains a 1, then this is a valid level 2 decode, otherwise the level 3 decoding is invoked. In all valid decode cases, the task identifier (TID) field of the TLB hardware register is loaded with 0x01 (the least significant bits of gr66). The following examples of level 2 decode values give actions specified:

0x10004480=>valid level 2, enable only read accesses, map to 0x8013fc0

0xefff04480=>only this 4k block is invalid, cause TLB miss error.

0x00000140=>level 3 decode table is at 0x140 offset from gr65 plus the level 2 offset in gr66. The level 3 word accessed will be at the third word of this table (bits 15 to 12 of virtual address is 3). So the actual location accessed will be at offset 0x140+0x1800+3=0x1943 from gr65. If that word has any of the UR, UV or UE bits=1, then this is a valid level 3 decode, otherwise a TLB miss error is reported. If the word contains 0x7f3ca600, then the location is enabled for reads or writes, the physical address will be 0x7f3cafc0, and this is normal addressing space (not I/O).

Figure 3:
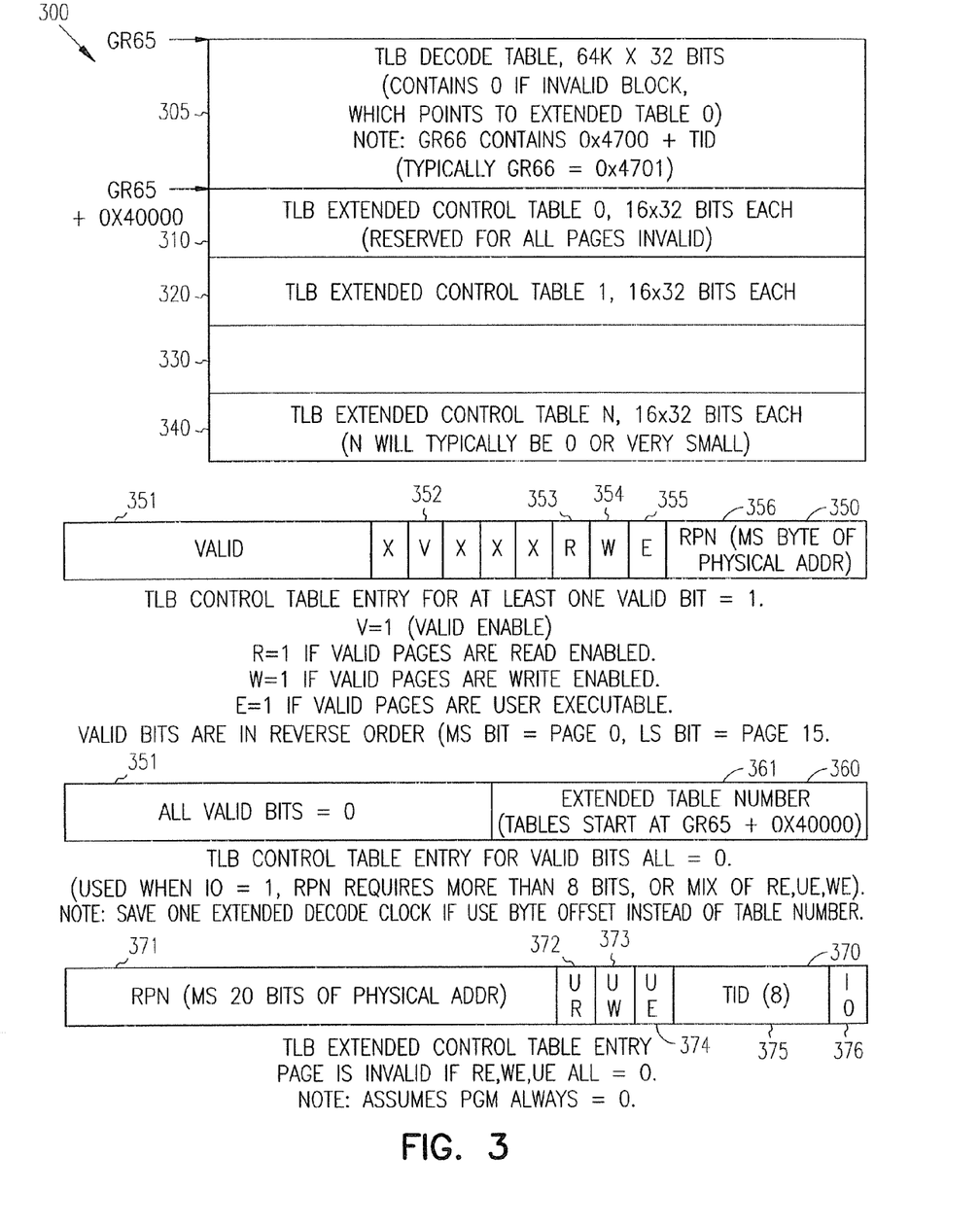
FIG. 3 is a text representation of a decode table structure according to an embodiment of the invention.

FIG. 3 is a block diagram of a table decode structure 300 referred to as a fast algorithm. This algorithm access a control word in the first access. The control word provides all information required to decode the majority of the memory blocks, or points to a further level for special blocks. In one embodiment, the first level contains 65536 entries. In one embodiment, the fast and slim algorithms are combined, with the fast algorithm being used for partitions that need extremely fast TLB interrupt times and have a single process (such as the 10 partition in one embodiment), and the slim algorithm for all others.

Table structure 300 comprises a first TLB decode table 305 having 64 k×32 bits. If the block is invalid, it contains zero, which points to an extended table 0 at 310. Extended table 0 is 16×32 bits each and reserved for all pages invalid. Further extended tables 1 through n are shown at 320, 330 and 340. Typically, n is zero, or very small.

TLB control table entries are shown at 350, 360 and 370. Entry 350 comprises a valid bit field 351, a V bit 352, R bit 353, W bit 354 and E bit 355. It also contains the RPN, or most significant byte of the physical address at 356. This table entry corresponds to any one of the bits in the valid bit field being 1, in which case V is also set to 1. R, W, and E correspond to read, write and executable as with the slim algorithm.

Control table entry 360 corresponds to all valid bits being zero, and comprises an extended table number at 361. This table starts immediately after the base decode table (at gr65 offset by 64 k) The table is used when IO=1, RPN requires more than 8 bits, or a mix of RE, UE, and WE. In an alternative embodiment, a byte offset is used instead of the table number to save one extended decode clock.

Control table entry 370 is an extended control table entry that is used when a page is invalid as indicated when RE, WE, and UE are all zero. A field, RPN 371 corresponds to the most significant 20 bits of physical address. The entry 370 also comprises bits UR at 372, UW at 373 and UE at 374, as well as TID field 375 comprising 8 bits and IO bit 376.

Figure 4:
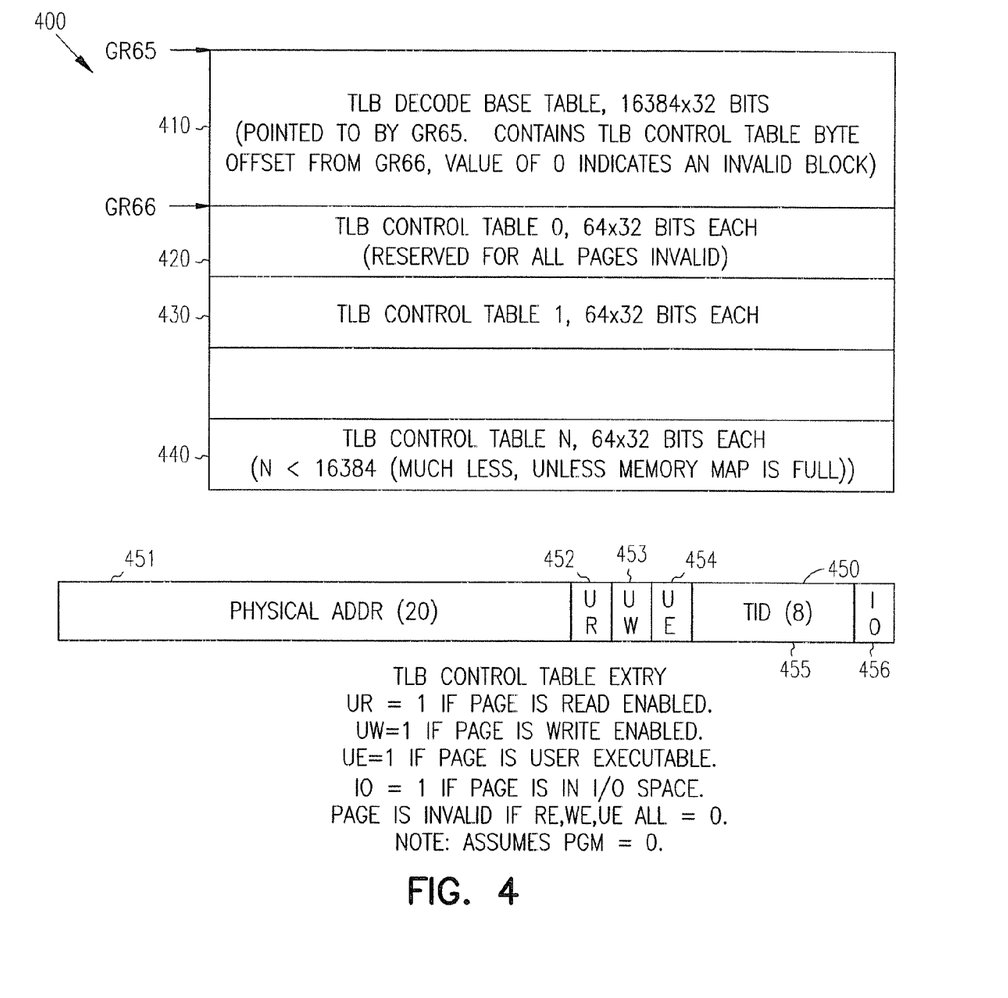
FIG. 4 is a text representation of a decode table structure according to an embodiment of the invention.

In a further embodiment, a fixed algorithm table structure is shown generally at 400 in FIG. 4. Table structure 400 comprises a TLB decode base table of 16384×32 bits. This table is pointed to by gr65 and contains a TLB control table byte offset from gr66. A value of zero indicates an invalid block. At 420, 430 and 440, TLB control table 0 through n are indicated. Each table is 64×32 bits and are reserved for all pages that are invalid. In one embodiment, n is less than 16384. It is much less unless the memory map is full. A table entry is shown at 450, and comprises a physical address 451 of 20 bits The table entry 450 also comprises UR bit 452, UW bit 453, UE bit 454, TID field 455 and IO bit 456. UR is 1 if the page is read enabled, UW is 1 if the page is write enabled and UE is 1 if the page is user executable. IO is 1 if the page is in I/O space. The page is invalid if RE, WE and UE are all zero.

Figure 5:
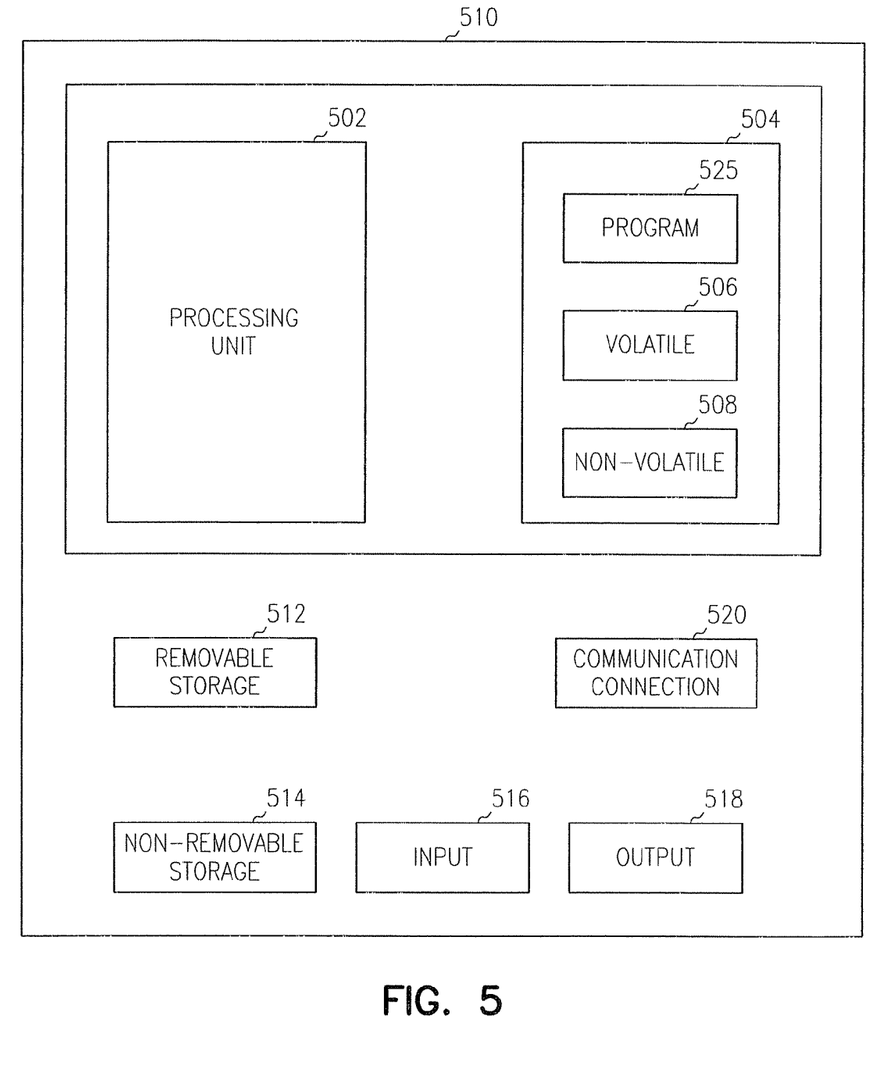
FIG. 5 is a simplified block diagram representation of a computer system for executing programming code according to an embodiment of the invention.

A block diagram of a computer system that executes programming for performing the above algorithm is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 500 to provide generic access controls in a COM based computer network system having multiple users and servers.

Figure 6:
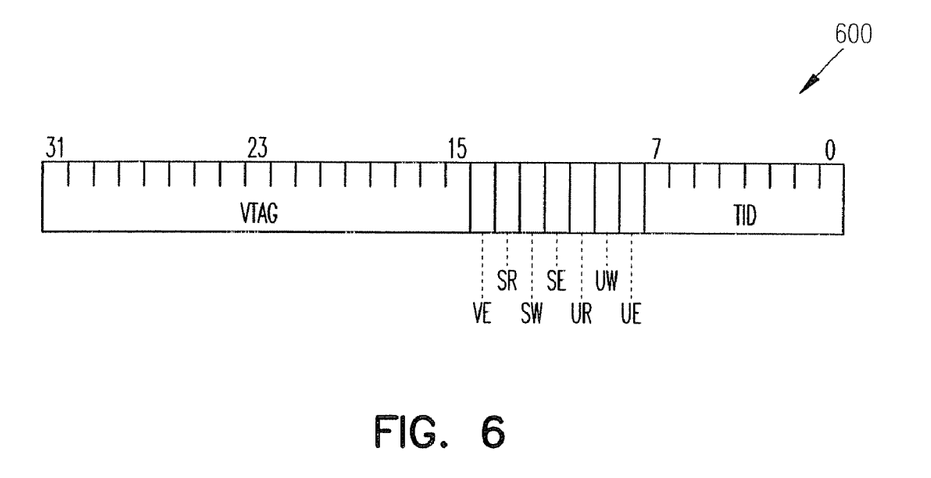
FIG. 6 is a diagram of a translation lookaside buffer entry word 0 hardware register.
Figure 7:
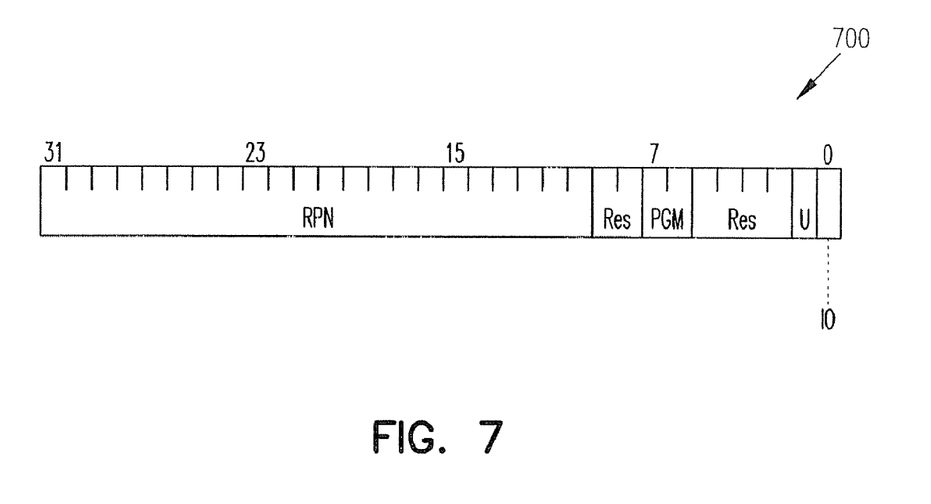
FIG. 7 is a diagram of a translation lookaside buffer entry word 1 hardware register.

Sample translation lookaside buffer entry word hardware registers are shown in FIGS. 6 and 7. A word zero register is shown at 600 in FIG. 6, and a word one register is shown at 700 in FIG. 7.

Word zero register 600 has 32 bits in this example, having the following definitions:

Bits 31-15: Virtual Tag (VTAG)—When the TLB is searched for an address translation, the VTAG field of the TLB entry must match the most significant 17, 16, 15, or 14 bits of the address being translated (for page sizes of 1, 2, 4, and 8 Kbyte, respectively) for the search to be successful.

When software loads a TLB entry with an address translation, the most significant 14 bits of the Virtual Tag are set with the most significant 14 bits of the virtual address whose translation is being loaded into the TLB. The remaining three bits of the Virtual Tag (17-15) must be set either to the corresponding bits of the address, or to zeros, depending on the page size, as follows (A refers to corresponding address bits):

| Page Size | VTAG2-VTAG0 (TLB Word 0 Bits 17-15) |
|---|---|
| 1 Kbyte | A A A |
| 2 Kbyte | A A 0 |
| 4 Kbyte | A 0 0 |
| 8 Kbyte | 0 0 0 |

Bit 14: Valid Entry (VE)—If this bit is 1, the associated TLB entry is valid; if it is 0, the entry is invalid.

Bit 13: Supervisor Read (SR)—If the SR bit is 1, Supervisor-mode load operations from the virtual page are allowed; if it is 0, Supervisor-mode loads are not allowed.

Bit 12: Supervisor Write (SW)—If the SW bit is 1, Supervisor-mode store operations to the virtual page are allowed; if it is 0, Supervisor-mode stores are not allowed.

Bit 11: Supervisor Execute (SE)—If the SE bit is 1, Supervisor-mode instruction accesses to the virtual page are allowed; if it is 0, Supervisor-mode instruction accesses are not allowed.

Bit 10: User Read (UR)—If the UR bit is 1, User-mode load operations form the virtual page are allowed; if it is 0, User-mode loads are not allowed.

Bit 9: User Write (UW)—If the UW bit is 1, User-mode store operations to the virtual page are allowed; if it is 0, User-mode stores are not allowed.

Bit 8: User Execute (UE)—If the UE bit is 1, User-mode instruction accesses to the virtual page are allowed; if it is 0, User-mode instruction accesses are not allowed.

Bits 7-0: Task Identifier (TID)—When the TLB is searched for an address translation, the TID must match the Process Identifier (PID) in the MMU Configuration Register for the translation to be successful. This field allows the TLB entry to be associated with a particular process.

Word one register 700 also has 32 bits having the following definitions:

Bits 31-10: Real Page Number (RPN)—The RPN field gives the most significant 22, 21, 20, or 19 bits of the physical address of the page for page sizes of 1, 2, 4, and 8 Kbyte, respectively. It is concatenated to bits 9-0, 10-0, 11-0, or 12-0 of the address being translated (for 1, 2, 4, and 8 Kbyte page sizes, respectively) to form the physical address for the access.

When software loads a TLB entry with an address translation, the most significant 19 bits of the Real Page Number are set with the most significant 19 bits of the physical address associated with the translation. The remaining three bits of the Real Page Number must be set either to the corresponding bits of the physical address, or to zeros, depending on the page size, as follows (A refers to corresponding address bits):

| Page Size | RPN2-RPN0 (TLB Word 1 Bits 12-10) |
|---|---|
| 1 Kbyte | A A A |
| 2 Kbyte | A A 0 |
| 4 Kbyte | A 0 0 |
| 8 Kbyte | 0 0 0 |

Bits 7-6: User Programmable (PGM)—These bits are placed on the MPGM1-MPGM0 outputs when the address is transmitted for an access. They have no predefined effect on the access; any effect is defined by logic external to the processor.

Bits 5-2: Reserved

Bit 1: Usage (U)—This bit indicates which entry in a given TLB line was least recently used to perform an address translation. If this bit is 0, then the entry in Set 0 in the line is least recently used; if it is 1, then the entry in Set 1 is least recently used. This bit has an equal value for both entries in a line. Whenever a TLB entry is used to translate an address, the Usage bit of both entries in the line used for translation is set according to the TLB set containing the translation. This bit is set whenever the translation is valid, regardless of the outcome of memory-protection checking.

Bit 0: Input/Output (IO)—The IO bit determines whether the access is directed to the instruction/data memory (IO=0) or the input/output (IO=1) address space.

The invention claimed is:

1. A method of translating a virtual address to a physical address of a memory for a computer system running a real time operating system, the method comprising:
   using a first translation algorithm having at least one level of indirection for a first partition of memory; and
   using a second translation algorithm having no indirection for a second partition of memory.

2. The method of claim 1 wherein the first translation algorithm uses a series of three translation lookaside buffer tables.

3. The method of claim 1 wherein the algorithms generate control words to translate the address for a majority of blocks of memory.

4. A system for translating a virtual address to a physical address in a real time operating system, the system comprising:
   a first translation mechanism having at least one level of indirection for a first partition of memory; and
   a second translation mechanism having no indirection for a second partition of memory.

5. The system of claim 4 wherein the first translation mechanism comprises a series of three translation lookaside buffer tables.

6. The system of claim 4 wherein the translation mechanisms comprises tables of control words that allow translation of the address for a majority of blocks of memory.

\* \* \* \* \*